(12) United States Patent
Douglas et al.

(10) Patent No.: US 9,886,036 B2
(45) Date of Patent: Feb. 6, 2018

(54) ROUTING OF AUTOMATED GUIDED VEHICLES

(71) Applicant: John Bean Technologies Corporation, Chicago, IL (US)

(72) Inventors: Barry Douglas, Doylestown, PA (US); Hugo L. Campacci, Hatfield, PA (US); Aram Bohdjelian, Fort Washington, PA (US); Michael C. Repko, Washington Crossing, PA (US)

(73) Assignee: John Bean Technologies Corporation, Chicago, IL (US)

( * ) Notice: Subject to any disclaimer, the term of this patent is extended or adjusted under 35 U.S.C. 154(b) by 161 days.

(21) Appl. No.: 14/618,951

(22) Filed: Feb. 10, 2015

(65) Prior Publication Data
US 2015/0227140 A1 Aug. 13, 2015

Related U.S. Application Data

(60) Provisional application No. 61/938,112, filed on Feb. 10, 2014.

(51) Int. Cl.
*G05D 1/02* (2006.01)
*G01C 21/34* (2006.01)

(52) U.S. Cl.
CPC ....... *G05D 1/0217* (2013.01); *G01C 21/3453* (2013.01); *G05D 2201/0216* (2013.01)

(58) Field of Classification Search
None
See application file for complete search history.

(56) References Cited

U.S. PATENT DOCUMENTS

| 4,049,961 A | 9/1977 | Marcy |
| 4,996,468 A | 2/1991 | Field |

(Continued)

FOREIGN PATENT DOCUMENTS

| EP | 1 447 354 A1 | 8/2004 |
| WO | 2012/166970 A1 | 12/2012 |
| WO | 2014/148975 A1 | 9/2014 |

OTHER PUBLICATIONS

Crane, C.D., and D.G. Armstrong, "Development of Intelligent Unmanned Systems," Technical Report No. AFRL-RX-TY-TR-2011-0049, Air Force Research Laboratory, Materials and Manufacturing Directorate, Tyndall Air Force Base, Fla., public release date Oct. 4, 2011, 34 pages.

*Primary Examiner* — Rami Khatib
*Assistant Examiner* — Nicholas K Wiltey
(74) *Attorney, Agent, or Firm* — Christensen O'Connor Johnson Kindness PLLC (57) ABSTRACT

A system for controlling the travel path of an automated guided vehicle (AGV) from a first location to a second location includes assigning a virtual penalty for impediments in the potential travel path of the AGV, for each turn required to be made by the AGV in the potential travel path, and for transfers from one elevator to another. The determined virtual penalties are factored in determining the most expeditious travel path from the first location to the second location. The virtual penalty may be a virtual distance penalty or a virtual time penalty composed of one or more of the distance of alternative travel paths available to avoid the impediment(s), the time required to remove or move the impediment(s), or the time required to wait for the impediment(s) to be removed.

15 Claims, 8 Drawing Sheets

(56) References Cited

U.S. PATENT DOCUMENTS

| | | | |
|---|---|---|---|
| 5,002,145 A * | 3/1991 | Wakaumi | B62D 1/28 |
| | | | 180/168 |
| 5,367,458 A | 11/1994 | Roberts | |
| 5,659,779 A * | 8/1997 | Laird | B61L 27/04 |
| | | | 700/245 |
| 5,793,934 A * | 8/1998 | Bauer | G05D 1/0274 |
| | | | 700/250 |
| 6,208,916 B1 | 3/2001 | Hori | |
| 6,249,743 B1 | 6/2001 | Ohshimo | |
| 6,496,754 B2 * | 12/2002 | Song | A47L 9/009 |
| | | | 318/568.12 |
| 6,799,099 B2 | 9/2004 | Zeitler | |
| 6,941,191 B2 | 9/2005 | Jaeger | |
| 6,941,200 B2 | 9/2005 | Sonoyama | |
| 7,066,291 B2 | 6/2006 | Martins | |
| 7,269,479 B2 * | 9/2007 | Okamoto | B25J 5/007 |
| | | | 318/568.12 |
| 7,609,175 B2 | 10/2009 | Porte | |
| 7,627,394 B2 | 12/2009 | Volcic | |
| 8,010,230 B2 | 8/2011 | Zini | |
| 8,115,439 B2 | 2/2012 | Yourlo | |
| 8,196,835 B2 | 6/2012 | Emanuel | |
| 8,210,791 B2 | 7/2012 | Chilson | |
| 8,214,081 B2 | 7/2012 | Choi | |
| 8,381,982 B2 | 2/2013 | Kunzig | |
| 8,538,692 B2 | 9/2013 | Wurman | |
| 8,594,923 B2 | 11/2013 | Wong | |
| 8,649,899 B2 | 2/2014 | Wurman | |
| 8,666,548 B2 | 3/2014 | Lim | |
| 8,688,275 B1 | 4/2014 | LaFary | |
| 8,694,382 B2 | 4/2014 | Aznavorian | |
| 8,712,679 B1 | 4/2014 | Mostofi | |
| 8,831,872 B2 * | 9/2014 | Hong | G05D 1/0253 |
| | | | 382/153 |
| 8,903,589 B2 * | 12/2014 | Sofman | G05D 1/0274 |
| | | | 700/258 |
| 9,037,396 B2 * | 5/2015 | Pack | G01C 21/30 |
| | | | 701/409 |
| 9,046,893 B2 | 6/2015 | Douglas | |
| 9,286,810 B2 * | 3/2016 | Eade | G09B 29/007 |
| 9,327,407 B2 * | 5/2016 | Jones | |
| 9,330,373 B2 * | 5/2016 | Mountz | G06Q 10/087 |
| 9,351,171 B2 * | 5/2016 | Dressler | H04W 16/18 |
| 9,377,781 B1 * | 6/2016 | Lee | G05D 1/0088 |
| 2004/0158355 A1 * | 8/2004 | Holmqvist | G05D 1/0236 |
| | | | 700/245 |
| 2005/0149256 A1 | 7/2005 | Lawitzky | |
| 2005/0182518 A1 | 8/2005 | Karlsson | |
| 2006/0049940 A1 * | 3/2006 | Matsuhira | G08B 13/19645 |
| | | | 340/541 |
| 2006/0089766 A1 * | 4/2006 | Allard | G05D 1/0061 |
| | | | 701/23 |
| 2006/0089800 A1 * | 4/2006 | Svendsen | G05D 1/027 |
| | | | 701/301 |
| 2007/0269299 A1 | 11/2007 | Ross | |
| 2008/0027591 A1 * | 1/2008 | Lenser | G05D 1/0251 |
| | | | 701/2 |
| 2008/0191937 A1 | 8/2008 | Wisherd | |
| 2008/0199298 A1 | 8/2008 | Chilson | |
| 2008/0294287 A1 * | 11/2008 | Kawano | B25J 9/1664 |
| | | | 700/252 |
| 2009/0088916 A1 * | 4/2009 | Elgersma | G05D 1/101 |
| | | | 701/23 |
| 2009/0198400 A1 * | 8/2009 | Allard | G05D 1/0061 |
| | | | 701/23 |
| 2009/0222159 A1 | 9/2009 | Bauer | |
| 2009/0326798 A1 * | 12/2009 | Insolia | G01C 21/3484 |
| | | | 701/533 |
| 2010/0063663 A1 * | 3/2010 | Tolstedt | G05D 1/0231 |
| | | | 701/23 |
| 2010/0063680 A1 * | 3/2010 | Tolstedt | G05D 1/0214 |
| | | | 701/41 |
| 2010/0106356 A1 * | 4/2010 | Trepagnier | G01S 17/023 |
| | | | 701/25 |
| 2010/0121517 A1 * | 5/2010 | Lee | G05D 1/0214 |
| | | | 701/25 |
| 2010/0247275 A1 | 9/2010 | Karlen | |
| 2010/0256908 A1 | 10/2010 | Shimshoni | |
| 2010/0262359 A1 * | 10/2010 | Motoyama | G01C 21/3446 |
| | | | 701/532 |
| 2010/0286905 A1 * | 11/2010 | Goncalves | G01C 21/12 |
| | | | 701/532 |
| 2011/0010023 A1 | 1/2011 | Kunzig | |
| 2011/0010033 A1 | 1/2011 | Asahara | |
| 2011/0054791 A1 * | 3/2011 | Surampudi | G01C 21/005 |
| | | | 701/472 |
| 2011/0153139 A1 | 6/2011 | Erb | |
| 2011/0153338 A1 * | 6/2011 | Anderson | G01S 1/68 |
| | | | 705/1.1 |
| 2011/0166721 A1 | 7/2011 | Castaneda | |
| 2012/0083923 A1 * | 4/2012 | Matsumoto | B25J 9/1664 |
| | | | 700/255 |
| 2012/0283905 A1 * | 11/2012 | Nakano | G05D 1/0214 |
| | | | 701/25 |
| 2012/0330492 A1 | 12/2012 | Douglas | |
| 2013/0041549 A1 * | 2/2013 | Reeve | B62D 15/025 |
| | | | 701/28 |
| 2013/0060458 A1 * | 3/2013 | Makela | E21C 35/08 |
| | | | 701/301 |
| 2013/0096735 A1 * | 4/2013 | Byford | G05D 1/0231 |
| | | | 701/2 |
| 2013/0158773 A1 * | 6/2013 | Wu | G05D 1/0231 |
| | | | 701/25 |
| 2013/0166134 A1 * | 6/2013 | Shitamoto | G05D 1/024 |
| | | | 701/26 |
| 2014/0200801 A1 * | 7/2014 | Tsuruta | B60W 30/00 |
| | | | 701/400 |
| 2014/0226490 A1 * | 8/2014 | Khera | H04L 45/12 |
| | | | 370/238 |
| 2014/0247116 A1 * | 9/2014 | Davidson | G06Q 10/087 |
| | | | 340/10.1 |
| 2014/0277691 A1 * | 9/2014 | Jacobus | G06Q 10/087 |
| | | | 700/216 |
| 2015/0025708 A1 * | 1/2015 | Anderson | A61B 5/6804 |
| | | | 701/2 |
| 2015/0094879 A1 * | 4/2015 | Pari | G05D 1/0276 |
| | | | 701/2 |
| 2015/0227140 A1 * | 8/2015 | Douglas | G05D 1/0217 |
| | | | 701/23 |
| 2015/0247734 A1 * | 9/2015 | Okada | G01C 21/34 |
| | | | 701/423 |
| 2015/0338226 A1 * | 11/2015 | Mason | G01C 21/3605 |
| | | | 701/408 |
| 2015/0370251 A1 * | 12/2015 | Siegel | G05D 1/0027 |
| | | | 701/2 |
| 2017/0109558 A1 * | 4/2017 | Jones | G06Q 10/087 |

* cited by examiner

ROUTING OF AUTOMATED GUIDED VEHICLES

CROSS-REFERENCE TO RELATED APPLICATION

This application claims the benefit of U.S. Provisional Application No. 61/938,112, filed on Feb. 10, 2014, which is herein expressly incorporated by reference.

BACKGROUND

Automated guided vehicles (AGVs) are battery-powered, cell-driven vehicles used to transport materials and other items from one location to another without any accompanying operator. AGVs are being increasingly used in the material handling industry and are an important part of the shift in production planning from high speed production to focus instead on efficient transportation of materials between work stations as well as into and out of storage. AGVs are important in this regard since they are capable of responding readily to frequently changing transport patterns and can be integrated into modern manufacturing plants, where flexible material handling systems are now required to perform an efficient routing of materials.

This flexibility of AGVs also manifests itself in the numerous different types of vehicles available as well as multiple guide paths for the vehicles. In addition, the number of vehicles in use can be easily changed, as pick up and drop off points and travel paths of the AGVs therebetween can be determined by software programming. Changes in the guide paths of vehicles can be made when the system is not operating; thus, there is no loss of efficiency. In addition, the control program for the AGVs can be altered without interfering with their operations.

Further, AGVs provide high reliability. In this regard, if an AGV breaks down, a spare vehicle can be used as a replacement, which is not the case in most other material handling systems. For example, if a conveyor breaks down, the result may be that the entire manufacturing facility becomes inoperable.

Moreover, the operating costs of AGVs are often lower than other types of material handling systems, since AGVs are unmanned and otherwise not as labor intensive as other systems. Further, the initial investment costs of AGVs are often less than other material handling systems.

In addition, AGVs are typically easily interfaced with other systems, including conveyors and overhead transport systems. AGVs are now widely used in material handling systems, textile manufacturing systems, container handling applications, and vehicle handling applications in numerous fields, including in the aerospace, automotive, clean room, food and beverage, mail processing, manufacturing, newsprint, pharmaceutical, plastics, and warehouse fields.

The design of the travel paths or routes of the AGVs has a significant impact on the overall system performance and reliability, since this directly affects the travel time and complexity of the software used to control the scheduling and travel paths of the AGVs. The present disclosure seeks to address improvements in the routing of AGVs.

AGVs are constrained by software to follow virtual guide paths from one location to another. Generally, there are sections of the guide path intended for general AGV travel as well as sections of the guide path or lanes specifically dedicated for the storage of inventory products, etc. The exact route than an AGV travels is typically controlled by control software that oversees all of the AGVs in a particular system and prevents them from colliding with each other. Usually, there are one or, at most, a few alternative routes to get to one location or another. If there is more than one route, the control software typically chooses the shortest route, which is thought to be the most efficient.

However, current routing of AGVs does not consider obstructions in the path of the AGV which may include inventory or product, a stalled AGV, a pathway that is too narrow for the AGV or its load to pass through, etc. Current routing of AGVs also does not factor in whether an AGV can route underneath a storage location, such as underneath shelving or a rack structure on which inventory or items to be retrieved are stored. In addition, current AGVs' routing control does not bear in mind the number of turns of the AGV that must be used to complete the path. Each turn that an AGV makes requires that it decelerate, rotate its wheels, and accelerate, thus causing a reduction of average speed of the vehicle at each turn, in addition to causing wear and tear on the vehicle tires as well as the underlying floor. In multi-floor travel paths, current routing of AGVs ignores the effect of routing an AGV through several elevators to reach a desired floor rather than using one or a fewer number of elevators. The system, method, and software of the present disclosure seek to address the foregoing shortcomings of current AGV control systems, methods, and software in seeking to achieve the most expeditious routing of AGVs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system for controlling the travel path of an AGV from a first location to a second location includes assigning a virtual penalty for one or more of the following: impediments in the potential travel path of the AGV; each turn required to be made by the AGV in the potential travel path; and transfers from one elevator to another. The system for controlling the path of the AGV also includes taking into consideration the assigned virtual penalties in determining the most expeditious travel path from a first location to a second location.

In the system, the virtual penalty is a virtual distance penalty or a virtual time penalty. Such virtual penalty may be based on one or more of the distance of alternative travel paths available to avoid the impediment(s); the time required to remove or move the impediment(s); and the time required for waiting for the impediment(s) to be removed.

The impediment(s) in the travel path of the AGV may include at least one of (a) inventory locations that require the AGV to avoid them; (b) the locations occupied by inventory requiring such inventory to be moved to clear the path for the AGV to travel; (c) locations that are too narrow for the AGV or its load to pass; (d) locations in which there is insufficient clearance for passage of the AGV for its load; (e) locations of at least one of shelving, storage racks, storage stands, or storage trays for products of inventory at an elevation above the floor; (f) the location of other AGVs; and (g) an obstruction.

The system includes assigning an infinite virtual distance for specific impediments. Such specific impediments may include another AGV in the pathway or pathway that is not large enough to permit the AGV and/or its load to pass by.

If in the system the travel path requires that the AGV use elevators to travel from one floor to another floor and the elevators have more than one crossover floor in common, the system includes identifying each crossover floor; determining if the path from one elevator to the other elevator on the crossover floor is obstructed, and if so, virtually removing such obstructions from the crossover path; and determining if a new route exists that is free of obstructions. If multiple crossover floors exist, the system selects a crossover floor with the shortest virtual distance or which requires the shortest virtual travel time between the applicable elevators on the crossover floor.

A method for controlling the travel path of an AGV from a first location to a second location includes assigning a virtual penalty for at least one of the following: impediments in the potential travel path of the AGV; each turn required to be made by the AGV in the potential travel path; and transfers from one elevator to another. The method takes into consideration the assigned virtual penalties in determining the most expeditious travel path from the first location to the second location.

In the method, the virtual penalty is a distance penalty or a time penalty. The virtual distance penalty may be based on the distance of alternative travel paths available in order to avoid impediments. The virtual time penalty may be based on one or more of the time required to travel to avoid any impediment(s); the time required to remove or move the impediment(s); and the time required for waiting for the impediment(s) to be moved.

In the method of the present disclosure, when taking into consideration the assigned virtual penalties in determining the most expeditious path from one location to a second location, the method includes determining the availability of alternative travel paths having a distance that is shorter than the determined travel path or having a travel time shorter than the determined virtual travel time.

The impediments in the travel path of the AGV include at least one of:
(a) inventory locations that require the AGV to avoid them;
(b) locations occupied by inventory requiring such inventory to be moved to clear the travel path for the AGV;
(c) locations that are too narrow for the AGV or its load to pass;
(d) locations in which there is insufficient clearance for passage of the AGV or its load;
(e) locations of at least one of shelving storage racks, shelving stands, or storage trays for product inventory at an elevation above the floor;
(f) the locations of other AGVs; and
(g) an obstruction.

In accordance with the present method, an infinite virtual distance is assigned for specific impediments. Such impediments may include another AGV in the pathway, or a pathway which is not large enough to permit the AGV and/or its load to pass.

In the present method, if the travel path requires that the AGV uses elevators to travel from one floor to another floor and the elevators have more than one crossover floor in common, then the method includes identifying each crossover floor; determining if the travel path from one elevator to another on a crossover floor is obstructed, and if so, virtually removing such obstruction(s) from the crossover path; and determining if a new route exists that is free of obstructions.

In accordance with the present method, if multiple viable crossover floors exist, the method includes selecting a crossover floor with the shortest virtual distance or which requires the shortest virtual travel time between the applicable elevators of the crossover floor. If different viable candidate crossover floors are associated with different candidate elevator banks, the present method includes selecting the candidate elevator bank that best fulfills the other standard elevator bank selection criteria.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or a substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application includes references to "directions," such as "forward," "rearward," "front," "back," "upward," "downward," "right hand," left hand," "in," "out," "extended," "advanced," and "retracted." These references and other similar references in the present application are only to assist in helping describe and understand the present invention and are not intended to limit the present invention to these directions.

In the following description, various embodiments of the present disclosure are described. In the following description and in the accompanying drawings, the corresponding systems assemblies, apparatus, and units are identified by the same part number but with an alpha suffix. The descriptions of the parts/components of such systems assemblies, apparatus, and units that are the same or similar are not repeated so as to avoid redundancy in the present application.

The present disclosure pertains to the control of AGVs. As noted above, AGVs are battery-powered, unmanned vehicles capable of transferring loads between locations through paths under computer control. Such AGVs can be of various configurations, including a towing vehicle capable of towing one or more trailers. Towing vehicles were the earliest AGVs in use. A second type of AGV is designated as a "unit load" vehicle. This unit load vehicle typically has a wide range of load decks as well as application configurations. The unit load vehicle may be symmetrical, thereby being capable of operating in either direction. Unit load vehicles are generally adapted for specific mission assignments, for example, for individual pallet movement. Unit load vehicles usually are used for automatic pick-up and delivery of product. They are normally used in warehousing and distribution systems where guide paths are typically relatively short but volumes are high.

A third type of AGV is the pallet truck, sometimes known as a "stop and drop" vehicle. The pallet vehicle may include a pallet jack or forks. Pallet trucks are typically manually loaded and then placed in a guide path and given a destination and then released to that destination. Such vehicles have a capacity typically in the range of about two to three tons, and thus are rather large vehicles.

A further type of AGV is the fork truck. The forks can be in front, behind, or to the side of the vehicle. In essence, these vehicles are akin to forklifts but without a human operator.

A further type of AGV is termed an "assembly" AGV. Typically, this is a specially designed vehicle to carry a product or a portion of a product to various work areas in the manufacturing or assembly process. Such vehicles could be small enough to transport one engine or one transmission, or large enough to transport an entire vehicle.

Their load-carrying mechanism is typically custom-tailored for the specific function to be performed for the specific product to be transferred. Such vehicles are usually integrated into an overall production system. For another purpose, such vehicles can be used in an automated parking garage.

Various systems have been developed for guiding or controlling the travel route of AGVs of the type discussed above. Such systems may include wires or magnetic tape or other markers positioned on the floor. Optical guidance systems may also be utilized including laser triangulation systems. In this regard, the AGV includes a rotating laser with a sender or source as well as a receiver or detector that strobes the area around the AGV and receives feedback from reflectors that are mounted about the area in walls, columns, on adjacent equipment, etc. This feedback information is used to calculate the precise location of the vehicle in the facility.

Figure 1:
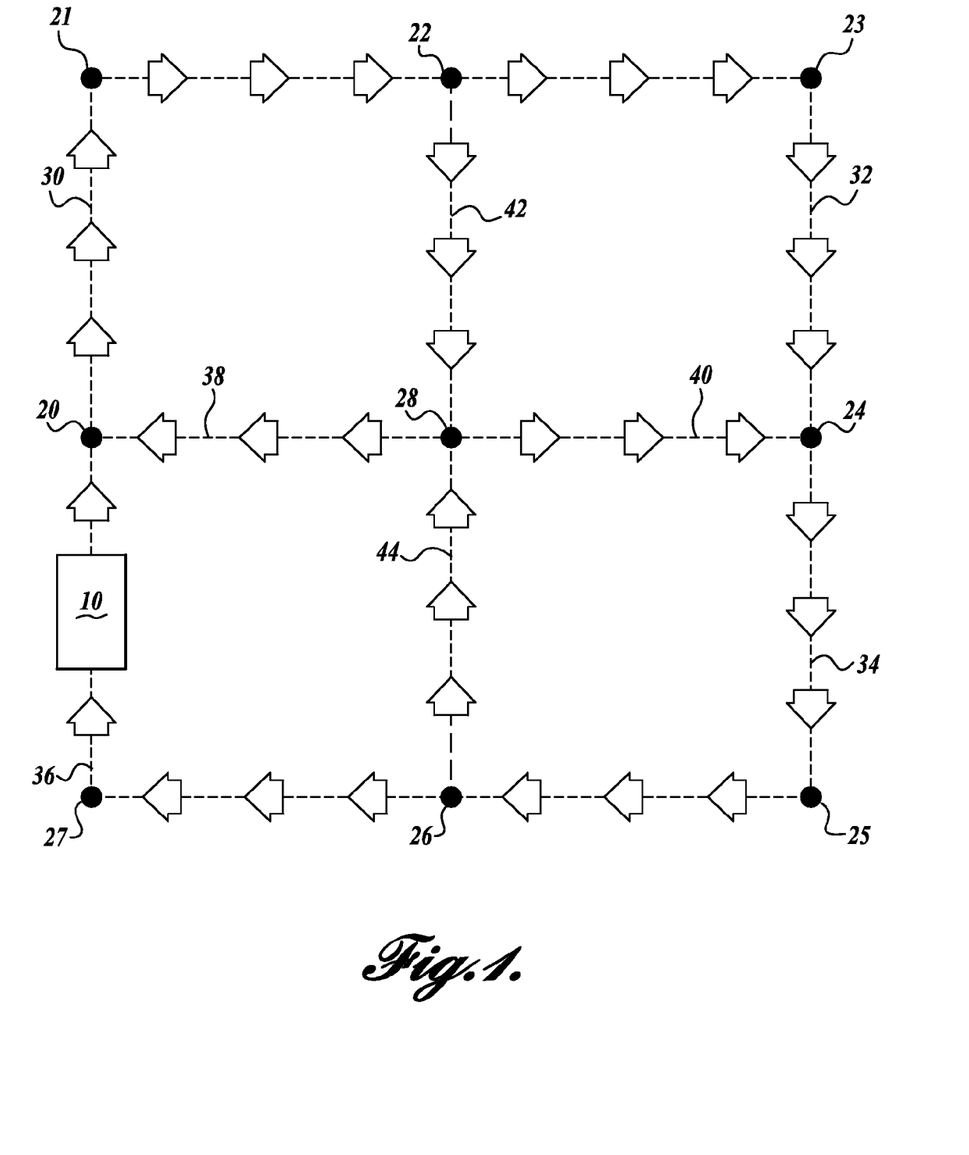
FIG. 1 is a schematic view of one form of a loop flow path for an AGV system.
Figure 2:
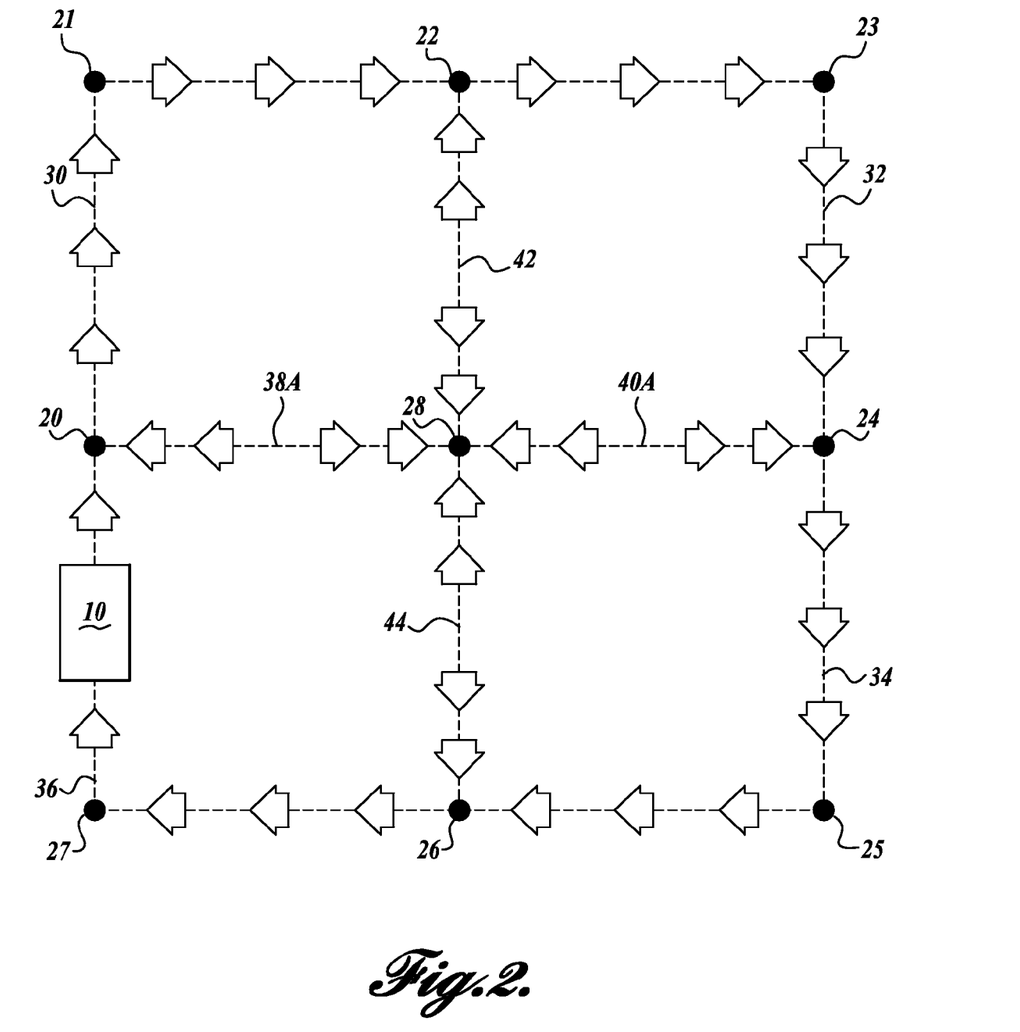
FIG. 2 is a schematic view similar to FIG. 1 but utilizing bidirectional routing.
Figure 3:
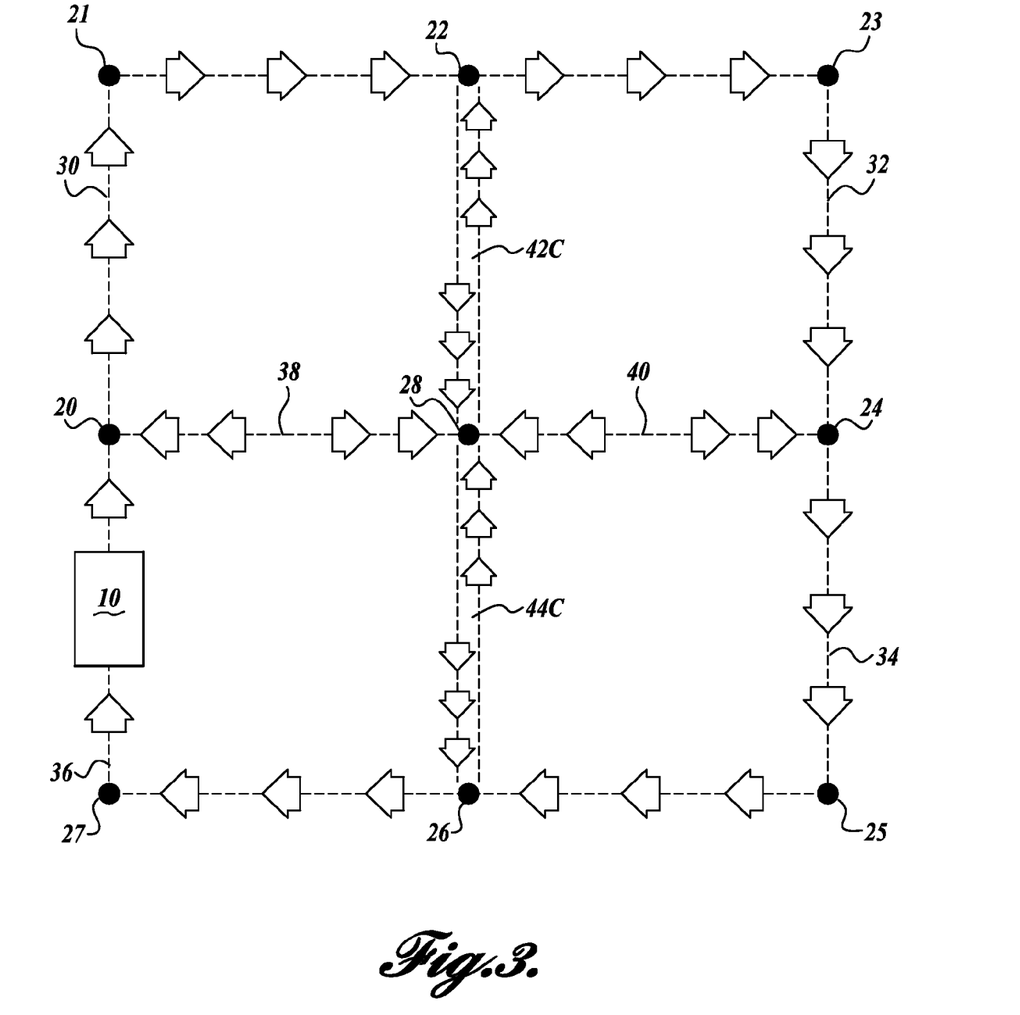
FIG. 3 is a schematic view similar to FIG. 1 but utilizing dual lane routing.

In a design of an AGV system, the flow path configuration is often very important and takes into consideration the physical layout of the facility within which the AGV operates. The flow path configuration can determine the total distance traveled by an AGV and the time required to carry out a particular task, which in turn affects efficiency of the material handling system. Typical flow path configurations can include loops, as shown in FIGS. 1-3, wherein the AGV 10 travels in loop paths. Moreover, the flow path can be configured so that the AGVs travel only in one direction about the loop, as shown in FIG. 1, wherein the AGV 10 travels between locations or nodes 20, 21, 22, 24, 26, 27, and 28 in the direction of the arrows shown in connecting paths 30, 32, 34, 36, 38, 40, 42, and 44.

As an alternative, a loop or other type of new path can be designed so that the AGVs 10 can travel in two directions throughout the new path or through portions of the new path, as shown in FIG. 2. In FIG. 2, the AGV 10 can travel bidirectionally in path segments 38A and 40A.

FIG. 3 depicts a flow path configuration wherein paths 42C and 44C are composed of dual lanes along which two AGVs can travel in different directions at the same time.

Of course, many other flow path configurations are possible. Nonetheless, AGVs are constrained to follow a virtual guide path from one location to another that is controlled by a programmable control system. As noted above, typically, the control system routes the AGV along a path based on the shortest distance between a pick up location and a drop off location, or between where the AGV is located, then to a pick up location, then to a drop off location, and then to a standby location where the AGV remains until the next task is assigned. If multiple routes for the AGV exist, current routing systems will evaluate each and choose the shortest route from the possible candidate routes. Typically, the routing algorithm of the control system does not take into consideration other system parameters, such as inventory or other AGV located in the travel path, obstructions in the flow path, the size of the AGV and/or load being carried versus the width of the available travel path, the number of turns required of the AGV to navigate the travel path, or the state of a crossover floor when the shortest route requires the AGV to traverse a crossable floor when changing elevators in order to reach a desired floor of a structure.

The present disclosure seeks to take into consideration numerous system parameters in addition to the shortest route, including impediments or obstacles in the potential travel path of the AGV, the number of turns required to be made by the AGV, as well as the need for the AGV to travel from one floor to another in a multi-floor structure. The routing system of the present disclosure evaluates these system parameters and dynamically adds a cost, burden, or penalty to a potential travel route in the form of a virtual distance that reflects the effect of the system parameter on the ability of the AGV to travel the proposed route. This cost, burden, or penalty can be in the form of a virtual distance penalty added to the route. As an alternative methodology, the cost, burden, or penalty can be in the form of an added virtual time required for the AGVs to complete its travel and perform required related tasks. In this regard, potential travel routes are evaluated and the evaluated travel route with the shortest route in terms of distance or time is selected.

As noted above, some of the system parameters that the present routing methodology takes into consideration are obstacles or obstructions, including inventory in the potential path of the AGV. Such obstacles or obstructions can be of numerous types, including stored product or inventory, inventory or product racks or shelving or stands, structure walls, doors, furniture, personnel work stations, manufacturing tools, restricted zones, contamination zones, danger zones, security zones, etc. For each such obstruction or obstacle, a cost in terms of a virtual distance or time is assigned. This occurs before a routing calculation is made. Thus, before a routing analysis is carried out, the control system is aware of the location and nature of all obstacles or obstructions, including inventory or product storage.

The virtual distance or time assigned can be based on, for example, the time required to travel around the obstruction or obstacle. Alternatively, if the obstruction or obstacle is inventory or product, the time required to move the inventory or product out of the path, for example, by use of other AGVs.

Figure 4:
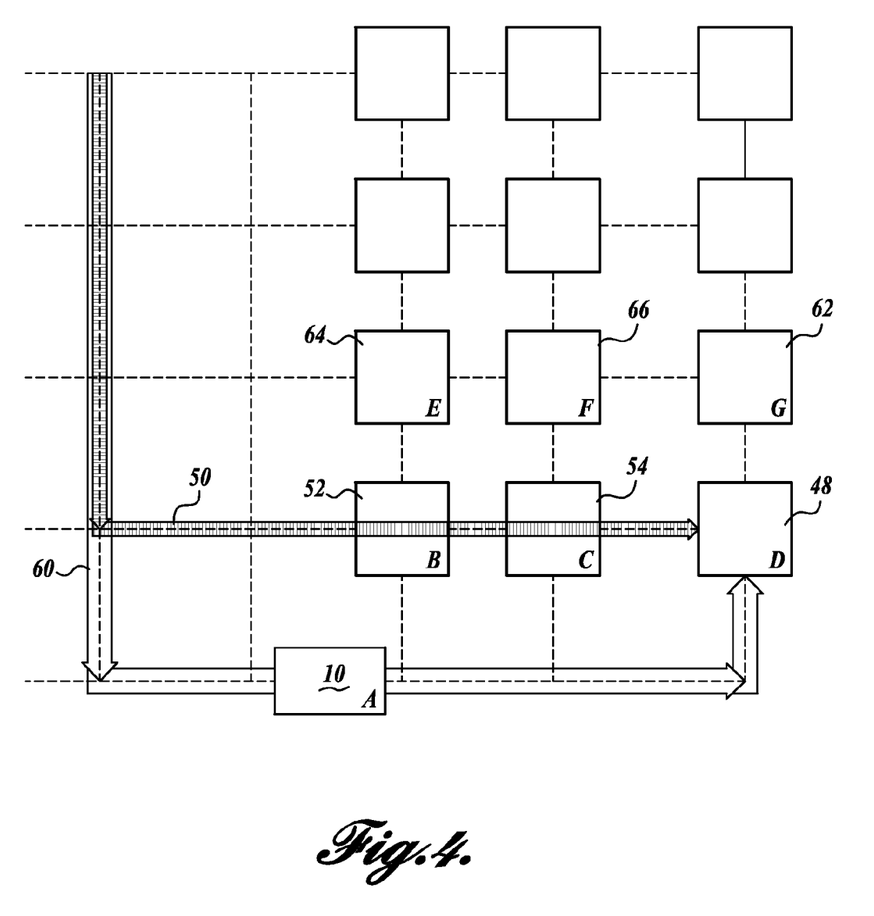
FIG. 4 is a schematic view of an AGV routing path avoiding obstacles/impediments.

FIG. 4 schematically shows a situation where an AGV 10 at point A seeks to retrieve inventory 48 at point D. An algorithm based on the shortest distance generates a proposed route along path 50. However, this path includes two pieces of inventory, 52 and 54, in the way. By adding a distance penalty on all of the inventory locations, the routing algorithm will generate a different route, for example, route 60, as the least cost route. A shortest distance algorithm, on the other hand, would require physical movement of inventory 52 and 54 at locations B and C, which is typically more expensive than traveling the few extra nodes required by path 60. Of course, if an alternative path is not available, a virtual distance cost would be applied for moving inventory at locations B and C out of the way. This can be the situation if, for example, the AGV was tasked to retrieve inventory 62 at location G. In such case, inventory 64 and 66 at locations E and F would have to be first moved out of the way so that the AGV can access inventory 62 at location G.

Another system parameter which the present routing method takes into consideration is whether the pathway for the AGV is wide enough to allow passage of the AGV and/or the load carried by the AGV. For example, in one section of a facility, the width of the travel path may be designed for movement of smaller sized inventory or products. In addition, the bays located off of the travel path in which the inventory is stored may be configured to reflect the smaller size of the inventory. However, it may be that the shortest path between the beginning and end point of the travel of an AGV, which is either retrieving or transporting to storage a larger sized inventory, may be routed through the location of the smaller sized inventory. This can be a viable travel path if inventory is not present along one side of the path along the route. In that case, the larger inventory can still be routed along the path through the area of smaller inventory.

But if there are any instances that inventory is present along both sides of the path for the smaller inventory, the proposed path may be too narrow for the larger inventory to pass by. Various options to address this situation are available, each with a virtual distance penalty.

A first option may be for the AGV to take a different route along a path that is wide enough for the transport of the load. This would result in a certain distance penalty. However, if no such alternative wider path exists, it may be necessary to move or shift inventory along the path. Typically, this virtual distance or time penalty will be significantly higher than rerouting the AGV to an acceptable path. The reason is that other AGVs must be called to move the obstructing inventory, and these additional AGVs must be routed along paths taking into consideration the same distance or time virtual penalties utilized with respect to the AGV carrying the load in question. As a third possibility, it may be that it is not possible to move the obstructing inventory in order to create a wider path. In that case, the node corresponding to the obstruction in question is given an infinite virtual distance or time value so that such pathway is not an option for the AGV.

Another system parameter is the location(s) of above-ground shelving, racks, or stands used to store inventory of products or other items. Such shelving/racks/stands may be designed to allow AGVs, when unloaded, to pass beneath the shelving/rack/stands. A travel route beneath the shelving/rack/stand is a viable option if the AGV is unloaded but not if the AGV is loaded. Thus, the routing system/method/software of the present disclosure when determining a route for a loaded AGV would assign a virtual distance of infinity to the route passing beneath the shelving or rack or stand. But, if the AGV is not loaded, routing the AGV under the shelving or rack may be part of the optimum virtual shortest distance route for the AGV.

A further system parameter considered by the routing method/system/software of the present disclosure is the number of turns which the AGV must make. As noted above, AGVs with a heavy load can cause damage to the floor because the wheels scrub the floor when making a change in direction. Typically, AGVs use one of two types of steering control, either a differential speed steering control or wheel steering control. In a differential speed steering control, two fixed drive wheels are used, with the speeds between the two drives on either side of the guide path changed to enable to the vehicle to negotiate a turn. In steered wheel control systems, an automotive-type control is used in which a front or rear steered wheel follows the guide path. Regardless of the type of steering control, the wheels of the AGV scrub the facility floor to make a change in direction. Moreover, to make a change in direction, the AGV must decelerate, rotate its wheels, and then accelerate, causing the average speed of the AGV to decrease with each turn. Such pivot turns are "counted" by monitoring and taking into consideration each angular change in direction made by the AGV along the travel path.

The routing system/method/software of the present disclosure seeks to minimize the number of turns in the route traveled by the AGV. This is accomplished by applying a virtual penalty (distance or time) for each turn that the AGV must make. As a consequence, the routing system/method/software of the present disclosure will factor in the effect of the number of pivot turns that the AGV must make in traveling a proposed route.

A further system parameter that the routing system/method/software of the present disclosure takes into consideration is known as the "vehicle itinerary." If multiple AGVs are used, the overall control system needs to manage the scheduling and routing of the AGVs to prevent collisions or deadlocks between one or more vehicles. Typically, when an AGV is navigating through a route, the control system "locks down" nodes along the vehicle route so that other AGVs will not utilize the same nodes which are occupied. As a consequence, no other AGV will attempt to navigate along the route where another AGV is traveling. This can be accomplished by applying an infinite distance penalty to the applicable node or nodes to prevent the routing algorithm to select a route already assigned to another AGV. As a consequence, the route or location of the AGV is virtually removed from the potential travel route for the other AGV(s) in question.

The foregoing itinerary "lock down" can be carried out in different ways. For example, as a first "static" methodology, the entire path of the AGV will remain locked down until the AGV completes its route or tour. This is feasible if the AGV system in question is small. Moreover, this methodology has the advantage of being simple. It may be that the effect of the "static" methodology can be at least someone militated by AGV paths that are bidirectional (see FIG. 3, above), although the control of bidirectional path AGV systems can be more complex because of the potential for shared path segments or nodes.

The second vehicle itinerary lockdown methodology is based on path segments used by different vehicles during different time windows. In this methodology, each path segment between two adjacent nodes indicates when in time that path segment will be occupied by an AGV, and, thus, when in time that path segment will be free or unoccupied. This enables the routing systems/software to develop for AGVs while avoiding two AGVs in the same time window. As a consequence, subsequent proposed travel paths cannot route through nodes at the same time window as a prior established AGV route passing through the node at a specific time window. One drawback of the time window methodology is that a significant amount of computer processing capability is required to determine the time windows and continually update the time windows.

A further methodology for vehicle itinerary lockdown is a dynamic system wherein all segments of a proposed travel path are determined during routing rather than before routing as in the prior two methodologies. This third methodology relies on knowing the locations and directions of travel and load status of each AGV when making routing decisions before the AGV actually travels along the section of the route in question. The methodology selects the next node for the AGV to travel so as to reach its destination based on the status of neighboring nodes and information about the global network of AGVs. In this methodology, the next node to be traveled to is selected among all adjacent nodes which will result in the shortest travel time for the AGV. This "next node-selection" process is repeated until the vehicle reaches its destination. This methodology is capable of being utilized in both unidirectional and bidirectional path networks. As can be appreciated, the dynamic methodology requires significant computational capability of the routing/control system for the AGVs.

Figure 5:
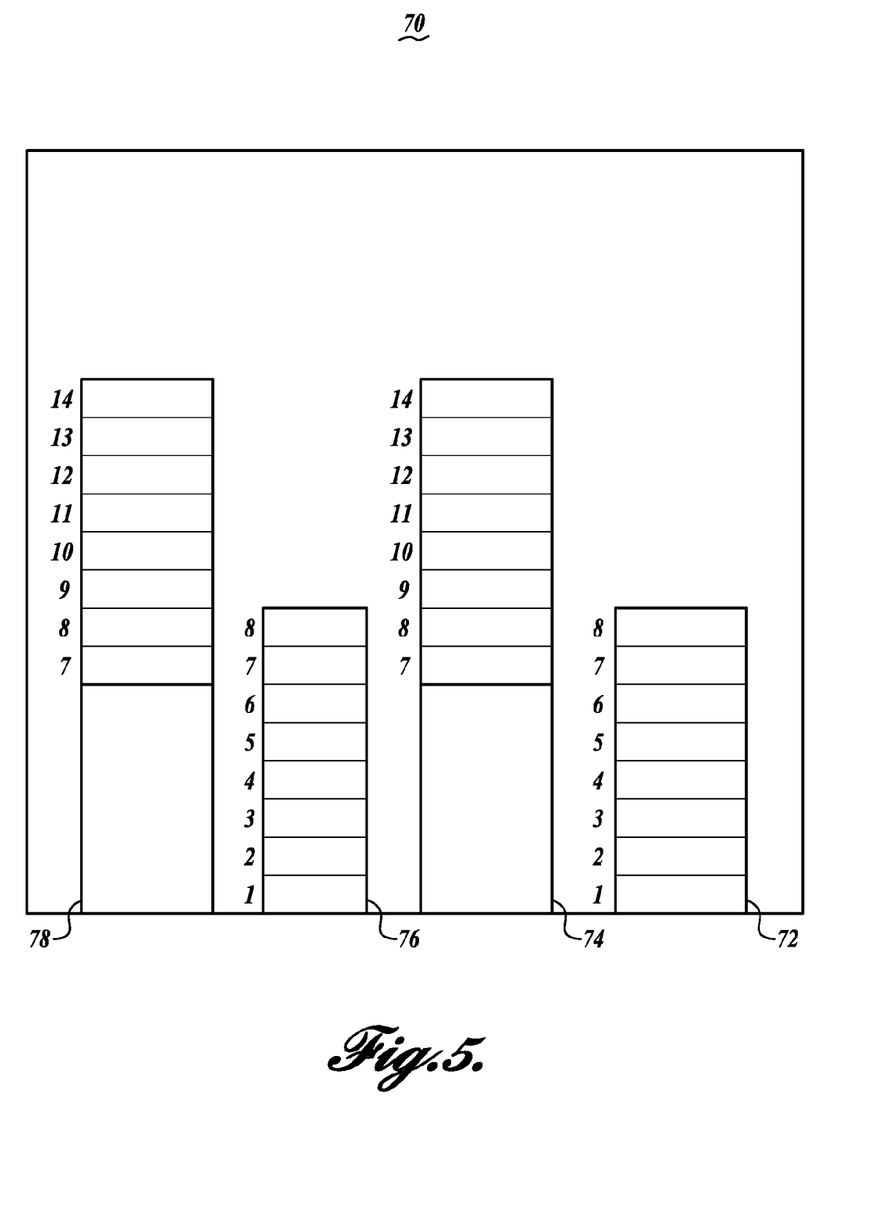
FIG. 5 is a schematic view of a structure utilizing a plurality of elevator banks wherein crossover floors are provided between the banks.

A further aspect of the present disclosure addresses routing of AGVs in structures having multiple floors and multiple elevators. FIG. 5 shows such a situation in multi-floor structure 70 utilizes four elevator banks, a first low-rise bank 72 servicing the first eight floors, a high-rise bank 74 servicing floors 7 through 14, and a high-rise bank 76 servicing floors 11 through 8, and a second high-rise elevator bank services floors 7 through 14. Ideally, the AGV would utilize a single elevator that runs from floor 1 to the desired floor or that utilizes a single elevator that runs from the upper floor at which the AGV is located down to the first floor. However, this is not always possible for at least several reasons. For example, the AGV may not have access at the bottom floor to the elevators of a bank extending all the way up to the destination floor. Moreover, even if the AGV has access to the applicable elevator bank that rises to the full height of the desired destination, there may be too many other AGVs queued up at that elevator bank or an obstruction may exist between the outlet doors of the full height elevators and the location on such floor to which the AGV needs to reach to retrieve its load. If it is necessary to route the AGV through multiple elevators, then a virtual penalty (distance or time) is applied to the proposed route of the elevator, because such route ties up two or more separate elevators, rather than a single elevator that would deliver the AGV to the desired floor.

In determining if alternate crossover floors will enable the AGV to reach its desired destination, the following two initial steps are carried out. On system startup, for each exit from each elevator onto a different floor (elevators of the nature that may be used with the present system often will have two doors), all of the entrances of the other elevators of such crossover floor are identified. This "look-up" information can then be used at the time that a crossover floor selection will need to be made. Then, at runtime, when the selection of an elevator is requested by the AGV, this look-up information will be used to determine if a crossover floor provides a route to the AGV's final destination, thus making the crossover floor a potential candidate.

Next, the viability of candidate crossover floors is evaluated. In this regard, if obstructions that cannot be cleared exist on a crossover floor, then those obstructions are given an infinite virtual distance or time penalty, thus removing the path along which such obstructions exist from being a viable route for the AGV. As discussed above, such obstructions may include, for example, a passageway that is too narrow for the AGV and/or its load to pass by. Another such obstruction may be an AGV that is stopped on a pathway due to a programming error or other error in its operation.

In utilizing the methodology discussed above, the shortest virtual distance route, if any, is determined for the candidate floor. This determination, as discussed above, considers avoiding impediments or obstructions by traveling around such impediment or obstruction, as well as imposing a virtual distance or time penalty for every turn required by the AGV. Once the shortest virtual distance/time route is determined, a check is made to verify that other AGV activity orders are not already queued for the crossover elevator or elevator bank in question. If so, either a penalty is assessed for this situation or the crossover floor can be removed as a potential travel path.

If there are multiple viable candidate crossover floors associated with the same candidate elevator bank, the crossover floor which provides the shortest virtual distance or time in the crossover path will be the one chosen. However, if the different viable candidate crossover floors are associated with different candidate elevator banks, then the candidate elevator bank which best fulfills the other standard elevator bank selection criteria will be chosen. Such criteria may include, for instance, the load capacity or size of the elevator versus the weight of the AGV combined with its load or the size of the combined AGV and load.

It may become necessary to prioritize between elevator bank selection based on crossover floor routing consideration or standard bank selection criteria. Such prioritization may be based the significance of the criteria. Obviously, an elevator bank cannot be chosen if the elevators are too small for the load or combined AGV and load. For example, the elevators of bank 76 are smaller than the elevators of bank 72. On the other hand, a crossover floor would not be a desirable candidate if access to entry to the desired elevator is blocked, for instance, by an AGV in error.

Since the choice of a crossover floor will be made as part of the bank selection process, the requesting AGV's itinerary needs to be modified not only for the selected elevator's boarding floor entry node but also for the chosen crossover floor. This can be achieved by excluding the nonchosen crossover floors from the AGV's potential route by, for example, assigning an infinite distance or time penalty to the non-selected crossover floors.

As a further matter, it is possible that the pathways of all candidate crossover floors are blocked by inventory, by passageways being too narrow, or by other impediments, including AGVs in error. In such situations, relatively large non-infinite distance/time penalties will be utilized to select the least or minimum cost to route and the associated crossover floor. Such distance/time penalties would include, for example, penalties associated with the number of inventory pieces that will need to be moved out of the way to make room for the AGV taking the crossover route.

Figure 6:
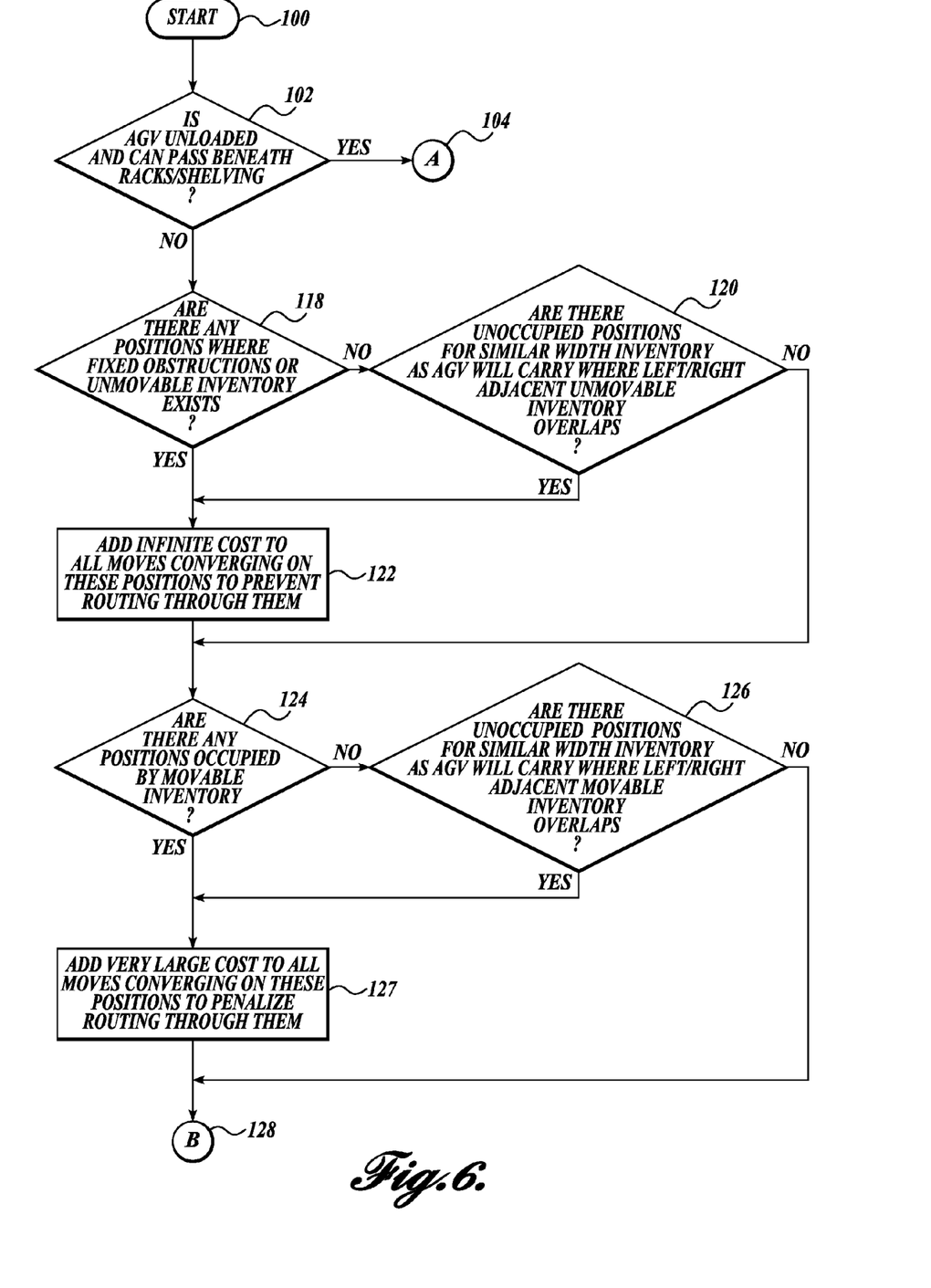
FIG. 6 is a flow diagram of an aspect of the present disclosure.

FIG. 6 provides a flow chart disclosing one possible specific methodology for determining the travel path for an AGV from a first location to a second location, wherein the flow path takes into consideration virtual penalties for impediments in the potential travel path as well as for each turn required to be made by the AGV in the potential travel path. Referring to FIG. 6, the illustrated methodology starts at start step 100. Thereafter, an inquiry is made at step 102 regarding whether the AGV is unloaded and can pass beneath racks or shelving. If the answer is YES, then the methodology proceeds to node A, identified by 104.

At node A, an inquiry is made at step 106 as to whether there are any travel nodes or travel path sections occupied by another AGV. If the answer is YES, then at step 108, an infinite penalty is assigned at step 108 for those nodes/path sections occupied by another AGV. Then the inquiry moves on to step 110, which is the same inquiry that would be made if at step 106 a determination was made that there are no other nodes occupied by an AGV. Step 110 pertains to calculating the shortest distance or least cost or least time required route from the location of the AGV to its destination. This calculation is carried out by using a roadmap of available paths that are updated for obstruction costs and also updated with a turn penalty cost for each turn required by the AGV.

Next, at step 112, all movable obstructions and movable inventory in the selected route are identified, and instructions or orders are made to shuffle or move all such movable obstructions and inventory. Next, at step 114, the calculated route is assigned to the AGV, and the AGV is released to travel the assigned route. As a consequence, the methodology reaches end point 116.

Next, referring back to step 102, if the AGV is loaded or cannot pass underneath overhead racks or shelving, then next, at step 118, an inquiry is made whether there are any positions where fixed obstructions or unmovable inventory exist. If not, then at step 120, the inquiry is made as to whether there are any unoccupied positions for similar width inventory as the AGV will carry, whether to the left or right of the adjacent unmovable inventory. If the answer is YES, and/or if the answer to the inquiry of step 118 is YES, then at step 122 an infinite cost is assigned to all moves or routes converging on these positions, thereby to prevent routing through these locations (step 122).

The next step in the process, step 124, which is also the next step after step 120, if the answer to the inquiry of that step is NO, poses the question as to whether there are any positions occupied by movable inventory. If the answer to that inquiry is NO, then at step 126, the inquiry is made as to whether there are unoccupied positions for similar width inventory as the AGV will carry, whether the left or right adjacent movable inventory overlaps. If the answer to this inquiry is NO, then the methodology proceeds to node B, labeled as 128. However, if the answer to the inquiry is YES, or if the inquiry is YES from the inquiry at step 124, then at step 127 a very large penalty cost is assigned to moving movable inventory, thereby to highly penalize routing through these locations. Thereafter, Node B, labeled as 128, is reached.

The next inquiry occurs at step 130 regarding whether there are any unoccupied positions for more narrow inventory than that which the AGV will carry. If the answer is NO, then the methodology proceeds to node A (104) and then continues from node A as described above. However, if the answer is YES, then at step 132, an inquiry is made as to whether the left and right adjacent positions along the path are sufficiently empty to provide clearance for the inventory carried by the ATV. If the answer is YES, then the inquiry shifts to node A, labeled as 104. However, if the answer is NO at step 132, then at step 134, an infinite cost is assigned to all routes seeking to pass through this location. Thereafter, the process proceeds to node A, and then the methodology continues from node A in the manner described above to reach end point 116.

Figure 7:
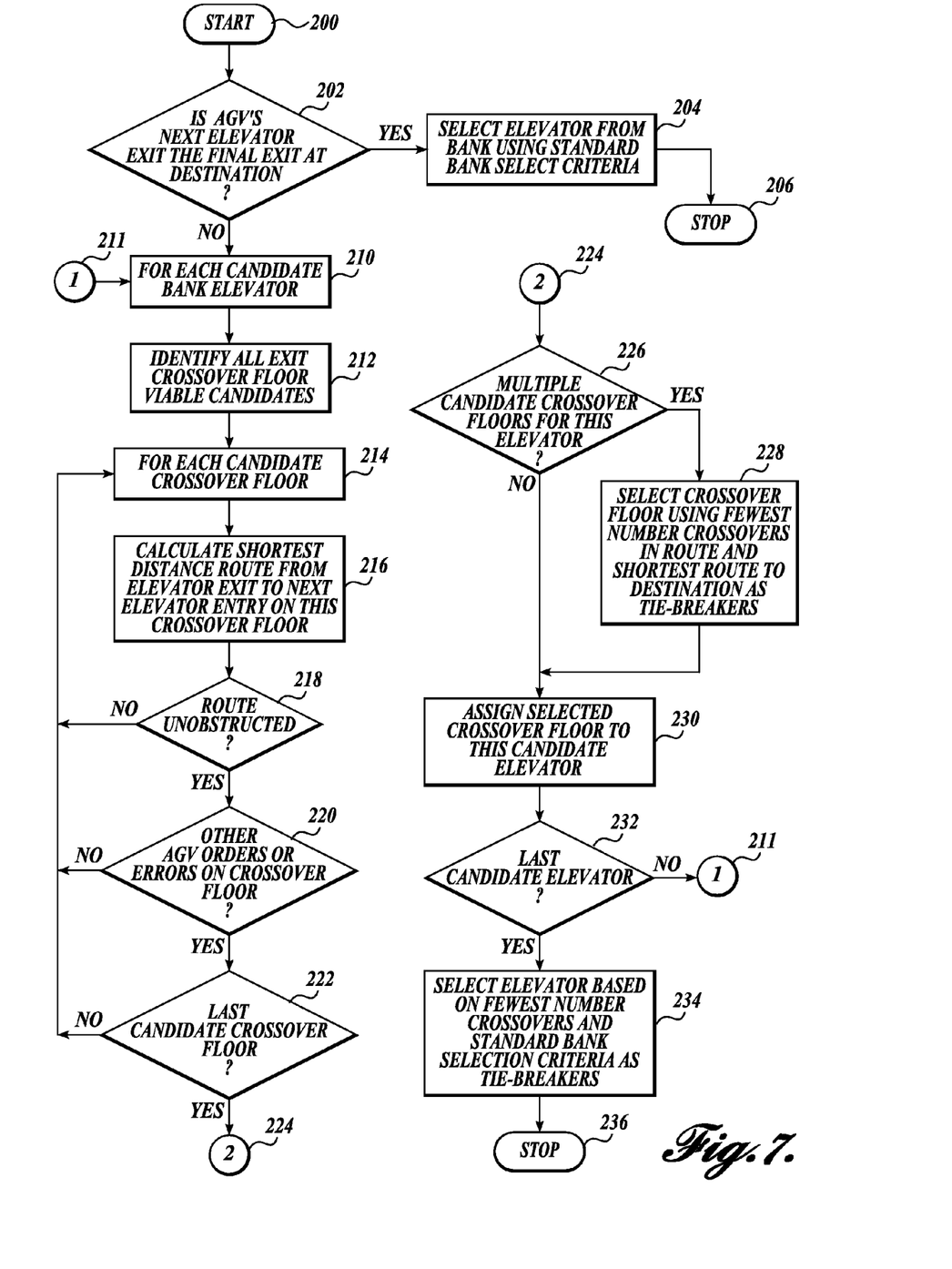
FIG. 7 is a flow diagram of a further aspect of the present disclosure.

FIG. 7 is a flow diagram that schematically illustrates one methodology of choosing the travel path when the AGVs are routed through structures having multiple floors and multiple elevators. The methodology begins at the start step 200, upon which the initial questions is asked at step 202 whether the AGV's next elevator exit is at the final exit designation. If so, then at step 204, an elevator is selected from the bank in question using standard bank selection criteria. Once such elevator is selected, the stopping point (206) is reached.

However, if at decision point 202 the answer is NO, then the inquiry progresses to step 210, whereupon at step 212 all exit crossover floor viable candidates are chosen, per the previous discussion. Next, at step 214, for each candidate crossover floor, a shortest route from the elevator exit to the next elevator entry on the crossover floor is calculated; see step 216. Then, at step 218, the question is posed whether the shortest distance route is unobstructed. If it is not, then the inquiry returns to step 214 to calculate the next shortest route from the elevator exit to the elevator entry on the crossover floor occurring at step 216. If, upon the second iteration, the route is found to be unobstructed, then the inquiry moves to step 220 regarding whether other AGV orders for the same elevators exist, or if there are AGVs in error on the crossover floor. If not, the inquiry returns back to step 214, so that the shortest distance route from the elevator exit to the elevator entry on the crossover floor can be determined.

However, if there are other AGV orders pending or AGV units in error condition, then the inquiry moves to step 222 regarding whether there are any more candidate crossover floors available. If not, the inquiry loops back to step 214 to determine the next shortest distance from the elevator exit to the next elevator entry on the crossover floor that is unobstructed and that does not have any AGV orders pending or an AGV in error on the calculated path. If at step 222, the last candidate crossover floor has been analyzed, then inquiry moves to node 224, wherein if there are multiple candidate crossover floors for the elevator proposed to be utilized by the AGV (step 226) then the crossover floor using the fewest number of crossovers en route in the shortest route to the destination is selected at step 228. Thereafter, either after step 228, or if in step 226 there are not multiple crossover floors available, then the crossover floor that is available or is selected is assigned to the candidate elevator proposed to be used by the AGV. This occurs at step 230. At step 232, the inquiry is made whether the selected elevator in question is the last candidate elevator, or whether there are more than one candidate elevators available. If there are no more candidate elevators available, the inquiry goes back to node 211, which is labeled as "1," and the process from node 211 is repeated until the last candidate elevator has been analyzed.

Once the last candidate elevator has been analyzed, then the elevator to be utilized is selected based on the fewest number of crossovers and also using standard bank selection criteria as a tie breaker, which occurs at step 234. At this point, the selection process has been completed, as indicated by stop step 236.

While illustrative embodiments have been illustrated and described, it will be appreciated that various changes can be made therein without departing from the spirit and scope of the invention.

The embodiment of the invention in which an exclusive property or privilege is claimed are defined as follows:

1. A system for selecting the travel path of a wheeled automated guided vehicle from a first location to a second location among available travel paths and controlling the travel of the wheeled automated guided vehicle along the selected travel path, comprising:
   (a) assigning a time or distance virtual penalty for each turn required to be made by the automated guided vehicle wheels in a potential travel path from a first location to a second location, each turn causing scrubbing of the wheels of the automated guided vehicle on the surface on which the wheeled automated guided vehicle is traveling;
   (b) assigning a time or distance virtual penalty for the following impediments encountered in the potential travel path of the wheeled automated guided vehicle, comprising:
      (i) inventory locations that will require the wheeled automated guided vehicle to avoid;
      (ii) locations occupied by inventory requiring such inventory to be moved to clear the travel path for the wheeled automated guided vehicle;
      (iii) locations that are too narrow for the wheeled automated guided vehicle or its load to pass by;
      (iv) locations in which there is insufficient clearance for passage of the wheeled automated guided vehicle or its load;
      (v) locations of at least one of shelving storage racks, storage stands, and storage trays for products or inventory at an elevation above the floor;
      (vi) the location of other automated guided vehicles; and
      (vii) an obstruction;
   (c) a controller taking into consideration the assigned virtual penalties for each turn required to be made by the wheeled automated guided vehicle and for the impediments encountered in the potential travel path of the wheeled automated guided vehicle, in determining the most expeditious travel path from available travel paths between a first location and a second location; and
   (d) the controller, using the determined most expeditious travel path to control the wheeled automated guided vehicle during travel from the first location to the second location.

2. The system of claim 1, wherein the virtual penalty is based on one or more of:
   the distance of alternative travel paths available to avoid the impediment(s);
   the time required to remove or move the impediment(s); and
   the time required for waiting for the impediment(s) to be removed.

3. The system according to claim 1, wherein an infinite virtual distance is assigned for:
   (a) another automated guided vehicle in the pathway; and
   (b) a pathway being not large enough to permit the wheeled automated guided vehicle and/or its load to pass by.

4. The system according to claim 1:
   wherein if the travel path requires that the wheeled automated guided vehicle use elevators to travel from one floor to another floor and the elevators have more than one crossover floor in common:
      (a) identifying each crossover floor;
      (b) determining if the travel path from one elevator to the other elevator on a crossover floor is obstructed, and if so, virtually removing such obstruction(s) from the crossover path; and
      (c) determining if a new route exists that is free of obstructions; and
   assigning a time or distance virtual penalty for traveling from one elevator to another on a crossover floor and for virtually removing obstructions from the crossover path.

5. The system according to claim 4, wherein if multiple viable crossover floors exist, the system selects a crossover floor with the shortest virtual distance or which requires the shortest virtual travel time between the applicable elevators on the crossover floor.

6. A method for selecting the travel path of a wheeled automated guided vehicle from a first location to a second location among available travel paths and controlling the travel of the wheeled automated guided vehicle along the selected travel path, comprising:
   (a) assigning a time or distance virtual penalty for each turn required to be made by the wheeled automated guided vehicle wheels in the potential travel path from a first location to a second location, each turn causing scrubbing of the wheels of the automated guided vehicle on the surface on which the wheeled automated guided vehicle is traveling;
   (b) assigning a time or distance virtual penalty for the following impediments encountered in the potential travel path of the wheeled automated guided vehicle, comprising:
      (i) inventory locations that will require the wheeled automated guided vehicle to avoid;
      (ii) locations occupied by inventory requiring such inventory to be moved to clear the travel path for the wheeled automated guided vehicle;
      (iii) locations that are too narrow for the wheeled automated guided vehicle or its load to pass by;
      (iv) locations in which there is insufficient clearance for passage of the wheeled automated guided vehicle or its load;
      (v) locations of at least one of shelving storage racks, storage stands, and storage trays for product of inventory at an elevation above the floor;
      (vi) the location of other wheeled automated guided vehicles; and
      (vii) an obstruction;
   (c) using a controller to take into consideration the assigned virtual penalties for each turn required to be made by the wheeled automated guided vehicle and for the impediments encountered in the potential travel path of the wheeled automated guided vehicle in determining the most expeditious travel path from available travel paths between a first location and a second location; and
   (d) controlling the wheeled automated guided vehicle to travel from the first location to the second location along the determined most expeditious travel path.

7. The method of claim 6, wherein the virtual distance penalty is based on the distance of alternative travel paths available to avoid the impediment(s).

8. The method according to claim 6, wherein the virtual time penalty is biased on one or more of:
   the time required to travel to avoid any impediments;
   the time required to remove or move the impediment; and
   the time required for waiting for the impediment to be removed.

9. The method according to claim 6, wherein, in taking into consideration the determined virtual penalties in determining the most expeditious path from the first location to the second location, comprising determining the availability of alternative travel paths having a distance that is shorter than the determined travel path or having a travel time shorter than the determined virtual travel time.

10. The method of claim 6, wherein the impediments comprise an obstruction selected from the group of:
    (a) walls;
    (b) doors;
    (c) furniture;
    (d) work stations;
    (e) restricted zones;
    (f) contaminated zones;
    (g) danger zones; or
    (h) security zones.

11. The method according to claim 6, wherein an infinite virtual distance is assigned for:
    (a) another automated guided vehicle in the pathway; and
    (b) a pathway being not large enough to permit the wheeled automated guided vehicle and/or its load to pass by.

12. The method of claim 6, further comprising assigning a time or distance virtual penalty for transfer of the wheeled automated guided vehicle from one elevator to another.

13. The method according to Claim 12, wherein if the travel path requires that the automated guided vehicle use elevators to travel from one floor to another floor and the elevators have more than one crossover floor in common:
    (a) identifying each crossover floor;
    (b) determining if the travel path from one elevator to the other elevator on a crossover floor is obstructed, and if so, virtually removing such obstruction(s) from the crossover path; and
    (c) determining if a new route exists that is free of obstructions.

14. The method according to claim 13, wherein if multiple viable crossover floors exist, the method selecting a crossover floor with the shortest virtual distance or which requires the shortest virtual travel time between the applicable elevators on the crossover floor.

15. The method according to claim 14, wherein if different viable candidate crossover floors are associated with different candidate elevator banks, selecting the candidate elevator bank that best fulfills the other standard elevator bank selection criteria.

* * * * *